United States Patent
Sakazawa et al.

(10) Patent No.: US 7,970,618 B2
(45) Date of Patent: Jun. 28, 2011

(54) CONTENT DISTRIBUTION SERVER FOR DISTRIBUTING CONTENT FRAME FOR REPRODUCING MUSIC AND TERMINAL

(75) Inventors: Shigeyuki Sakazawa, Fujimino (JP); Koichi Takagi, Fujimino (JP); Hiroshi Mitsuhashi, Shinjuku-ku (JP); Koji Katayama, Shinjuku-ku (JP)

(73) Assignee: KDDI Corporation, Tokyo (JP)

( * ) Notice: Subject to any disclaimer, the term of this patent is extended or adjusted under 35 U.S.C. 154(b) by 1052 days.

(21) Appl. No.: 10/592,365

(22) PCT Filed: Mar. 31, 2005

(86) PCT No.: PCT/JP2005/006308
§ 371 (c)(1),
(2), (4) Date: Sep. 11, 2006

(87) PCT Pub. No.: WO2005/096270
PCT Pub. Date: Oct. 13, 2005

(65) Prior Publication Data
US 2007/0203696 A1      Aug. 30, 2007

(30) Foreign Application Priority Data
Apr. 2, 2004  (JP) ................................. 2004-109728

(51) Int. Cl.
*G10L 19/00*         (2006.01)
(52) U.S. Cl. ..................... 704/500; 704/504; 455/414.4; 705/26.1; 379/207.16
(58) Field of Classification Search .................. 704/504, 704/500; 455/414.4; 705/26.1; 379/207.16
See application file for complete search history.

(56) References Cited

U.S. PATENT DOCUMENTS

| | | | |
|---|---|---|---|
| 6,515,212 B2 * | 2/2003 | Taira et al. ..................... | 84/609 |
| 6,542,869 B1 * | 4/2003 | Foote ............................ | 704/500 |

(Continued)

FOREIGN PATENT DOCUMENTS

GB          2363227 A    * 12/2001

(Continued)

OTHER PUBLICATIONS

Takeshi et al. "Mobile Innovation and the Music Business in Japan: The Case of Ringing Tone Melody" May 2003.*

*Primary Examiner* — Richemond Dorvil
*Assistant Examiner* — Greg Borsetti
(74) *Attorney, Agent, or Firm* — Oblon, Spivak, McClelland, Maier & Neustadt, L.L.P.

(57) ABSTRACT

There is provided a system capable of distributing code-compressed data based on audio data on a music composition via the Internet to a mobile telephone so that a user can cut out a desired range from the code-compressed data and register it as a call sound. The system has a data structure of a content frame (3GPP, 3GPP2) containing code-compressed data (AAC) of audio data. The content frame has at least one cut-out position information in the AAC data in its extended function section. A mobile telephone has a content storage unit, a cut-out selection unit to be used by the user to select at least one cut-out position information contained in the extended function section of the content frame, and a data cut-out section for cutting out data from the code-compressed data. The code-compressed data which has been cut out is decompressed when called and the sound is outputted from a loudspeaker.

13 Claims, 7 Drawing Sheets

U.S. PATENT DOCUMENTS

| | | | | |
|---|---|---|---|---|
| 6,555,738 B2* | 4/2003 | Hughes et al. | | 84/609 |
| 6,640,086 B2* | 10/2003 | Wall | | 455/3.04 |
| 6,647,417 B1* | 11/2003 | Hunter et al. | | 709/225 |
| 6,670,537 B2* | 12/2003 | Hughes et al. | | 84/609 |
| 6,778,648 B1* | 8/2004 | Alston et al. | | 379/93.27 |
| 6,961,631 B1* | 11/2005 | Puryear | | 700/94 |
| 6,985,856 B2* | 1/2006 | Wang et al. | | 704/226 |
| 7,113,981 B2* | 9/2006 | Slate | | 709/217 |
| 7,209,900 B2* | 4/2007 | Hunter et al. | | 705/58 |
| 7,233,658 B2* | 6/2007 | Koser et al. | | 379/373.01 |
| 7,254,414 B2* | 8/2007 | Nakamura et al. | | 455/556.1 |
| 7,302,396 B1* | 11/2007 | Cooke | | 704/500 |
| 7,440,365 B2* | 10/2008 | Hattori et al. | | 369/47.13 |
| 7,478,249 B2* | 1/2009 | Kii et al. | | 713/193 |
| 7,689,670 B2* | 3/2010 | Holm et al. | | 709/219 |
| 2002/0035914 A1* | 3/2002 | Togashi | | 84/609 |
| 2002/0152876 A1* | 10/2002 | Hughes et al. | | 84/609 |
| 2003/0016813 A1* | 1/2003 | Weiner | | 379/373.02 |
| 2004/0068532 A1* | 4/2004 | Dewing et al. | | 709/200 |
| 2004/0092295 A1* | 5/2004 | Yamada | | 455/567 |
| 2004/0193429 A1* | 9/2004 | Kimoto | | 704/278 |
| 2004/0252036 A1* | 12/2004 | Nitzpon et al. | | 341/61 |
| 2005/0004873 A1* | 1/2005 | Pou et al. | | 705/51 |
| 2005/0065780 A1* | 3/2005 | Wiser et al. | | 704/201 |
| 2005/0091268 A1* | 4/2005 | Meyer et al. | | 707/103 R |
| 2005/0215239 A1* | 9/2005 | Kopra et al. | | 455/414.1 |
| 2005/0232578 A1* | 10/2005 | Godtland et al. | | 386/46 |
| 2005/0234714 A1* | 10/2005 | Takagi et al. | | 704/225 |
| 2006/0190980 A1* | 8/2006 | Kikkoji et al. | | 725/114 |
| 2006/0199575 A1* | 9/2006 | Moore et al. | | 455/418 |
| 2006/0259434 A1* | 11/2006 | Vilcauskas et al. | | 705/57 |
| 2006/0288851 A1* | 12/2006 | Kawamura et al. | | 84/624 |

FOREIGN PATENT DOCUMENTS

| | | |
|---|---|---|
| JP | 2002 99287 | 4/2002 |
| JP | 2002-99287 A | 4/2002 |
| JP | 2002 169568 | 6/2002 |
| JP | 2002 207489 | 7/2002 |
| JP | 2002 244681 | 8/2002 |
| JP | 2003 223167 | 8/2003 |
| JP | 2004-7598 A | 1/2004 |
| JP | 2004 23298 | 1/2004 |

* cited by examiner

Fig. 5
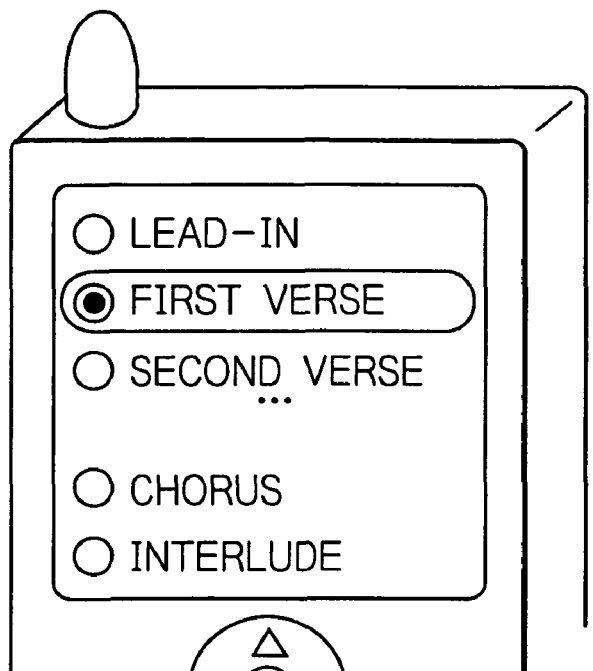
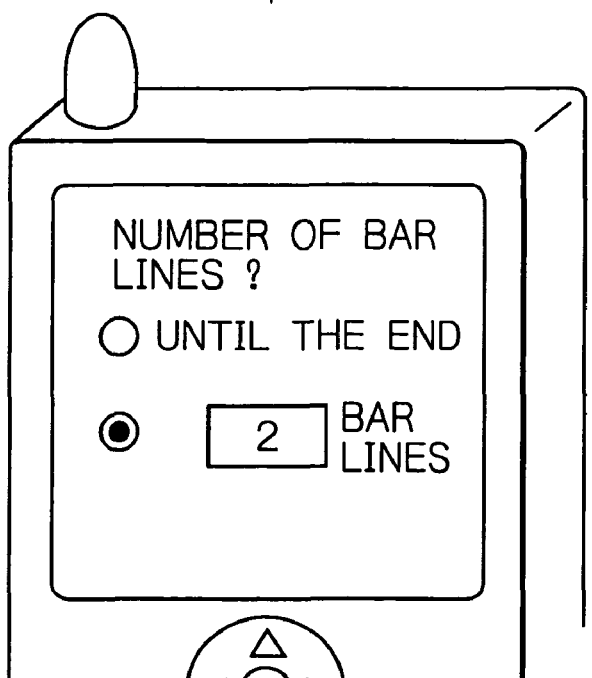

Fig. 6
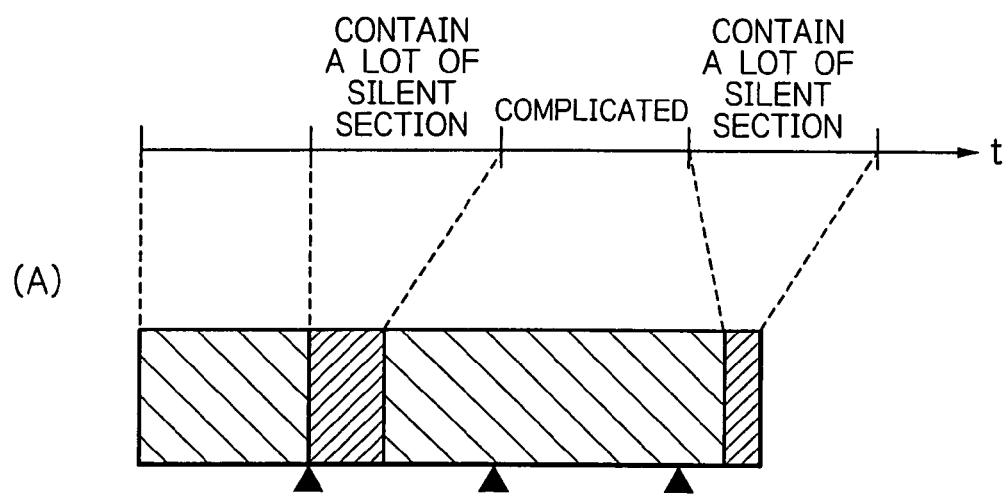
(A)
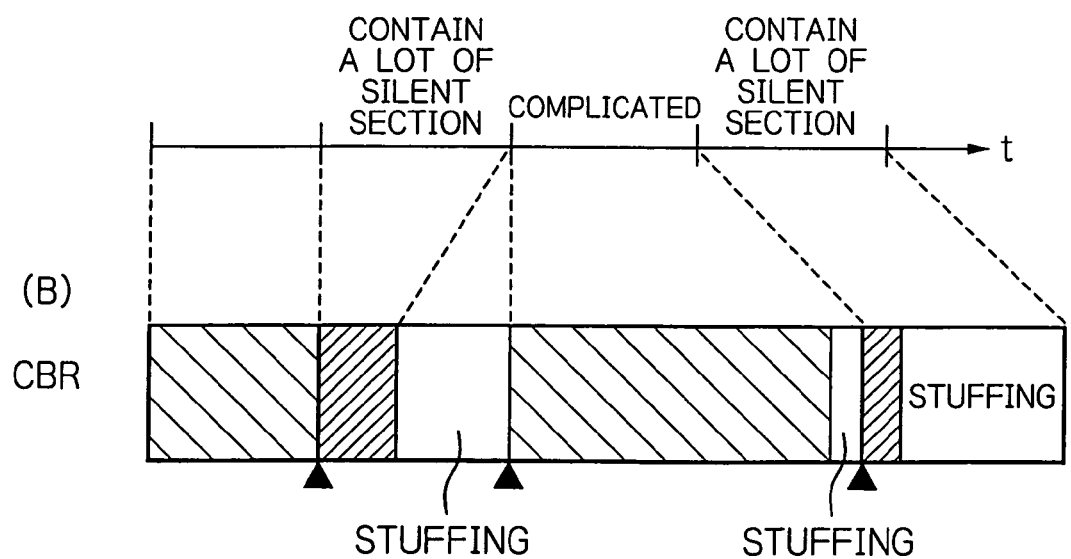
(B) CBR

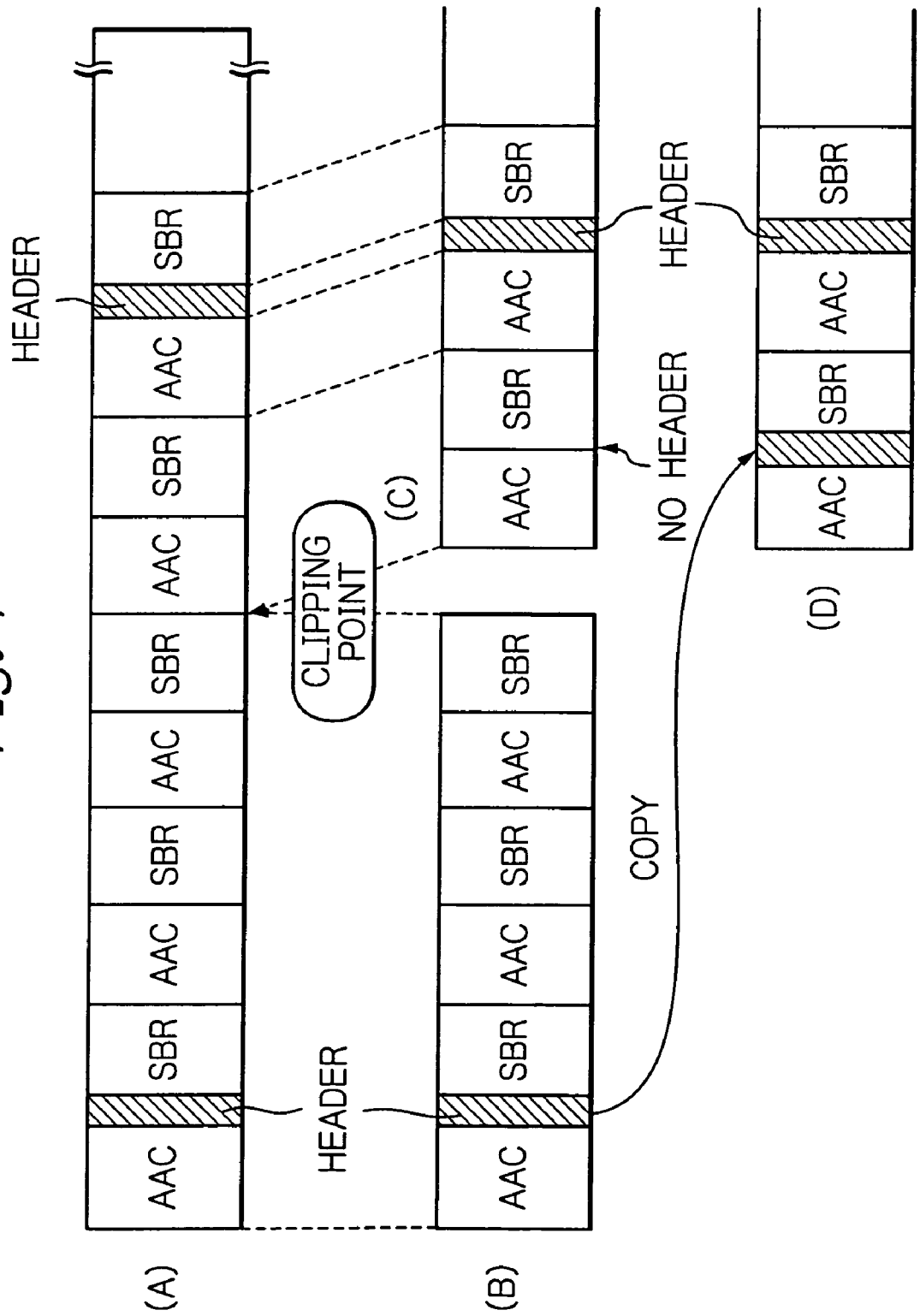

CONTENT DISTRIBUTION SERVER FOR DISTRIBUTING CONTENT FRAME FOR REPRODUCING MUSIC AND TERMINAL

The present invention relates to a content distribution server for distributing content frame for replaying music, and a mobile terminal for replaying music data by the trigger, such as the incoming call to the mobile terminal.

About the data of ring tone for the mobile terminal, one melody consists of a plurality of musical note data, which is aligned in order of time, as well as scale, volume and length data. The mobile terminal gets the musical note data about 30 seconds length from a content distribution server.

According to JP patent publication No. 2004-23298A, a ringing section in the musical note data can be set by the mobile terminal. The melody of the desired section is ringed by specifying the start position and end position.

In addition, as the performance of the mobile terminal is improved, there has been a stronger demand to use original music sound, which is commercially available, for the ringing tone of the mobile terminal. The distributed content is a short time and a small volume of code-compressed data, which is applied for the ringing tone of the mobile terminal. The mobile terminal downloads the content from the content distribution server. The mobile terminal decompresses and decodes this code-compressed data, and then replays the content in case of incoming call.

FIG. 1 shows a content distribution system for the mobile terminal.

According to a system configuration in FIG. 1, a content distribution server 1 is connected to the Internet 4, and a mobile terminal 20 is connected to a mobile network 5. The mobile network 5 and the Internet 4 are interconnected via a gateway 6. The content distributed by the content distribution server 1 is received by the mobile terminal 20.

However, the ringing start position can not be set to code-compressed data generated from the original music sound, which is commercially available, by the method described in JP patent publication No. 2004-23298A, because audio data is not corresponding to each tone, while the musical note data is corresponding to.

Further, if the ringing start position could be set using another technique, the mobile terminal needs to seek for the ringing start position from the head of the code-compressed data. This means it is impossible to replay the section immediately.

It is therefore an object of the present invention to provide a system, which distributes the code-compressed audio data of one song to the mobile terminal via the Internet, and a user of the mobile terminal can clip a desired section from the code-compressed audio data, and register the desired section to the mobile terminal for the ringing tone.

According to the invention, a content distribution server for distributing a content frame, which has code-compressed data of audio data and at least one clipping position for the code-compressed data in a extended function section, includes a coder performing compressed coding of audio data and outputting code-compressed, clipping indication means for outputting the number of data units at the user selection time position as a clipping position based on the time count of the audio data and the number of data units from head of the code-compressed data, and frame generation means for generating the content frame by putting the code-compressed data in a data section and by putting the clipping position in the extended function section of the content frame.

According to another aspect of the content distribution server, the code-compressed data has a plurality of fragment sections, each fragment section has a plurality of chunk sections, each chunk section has a plurality of sample sections, and the clipping position has a start position and a end position specified by samples, the start position is expressed by the number of data units from head of the code-compressed data, the end position is expressed by the number of data units from head of the code-compressed data or by the number of data units from the start position, and the start and the end position have a title text explaining the position and/or fading information for replaying.

According to another aspect of the content distribution server, the code-compressed data is a ISO based media file format data, and the content frame is a 3GPP or 3GPP2 file format.

According to the invention, a terminal for receiving a content frame, which has code-compressed data of audio data and at least one clipping position for the code-compressed data in a extended function section, includes content memory means for storing the content frame and the clipped code-compressed data, clipping selection means for outputting the screen image data to enable the selection of a clipping position by the user among clipping positions included in the extended function section, and clipping means for clipping the data section corresponding to the selected clipping position from the code-compressed data of the content frame.

According to another aspect of the terminal, the code-compressed data has a plurality of fragment sections, each fragment section has a plurality of chunk sections, each chunk section has a plurality of sample sections, and the clipping position has a start position and a end position specified by samples, the start position is expressed by the number of data units from head of the code-compressed data, the end position is expressed by the number of data units from head of the code-compressed data or by the number of data units from the start position, and the start and the end position have a title text explaining the position and/or fading information for replaying.

According to another aspect of the terminal, the code-compressed data is a ISO based media file format data including AAC data and SBR data, the content frame is a 3GPP or 3GPP2 file format, and the clipping means copies a preceding header for SBR data to head of the clipped data, in case the preceding header is for the clipped data and not included in the clipped section.

According to another aspect of the terminal, it further includes replay trigger means for reading out the clipped code-compressed data from the content memory means when it receives the trigger, a decoder for decoding the clipped code-compressed data and outputting the decoded audio data, and speaker output means for outputting the decoded audio data to speaker system.

According to another aspect of the terminal, it is a mobile terminal, and the trigger is incoming call.

According to another aspect of the terminal, it further includes a clipping indication means for outputting the number of data units at the user selection time position as a clipping position based on the time count of the audio data and the number of data units from head of the code-compressed data, and the content memory means add the clipping position to a extended function section of the content frame.

According to the invention, a data structure of a content frame, which has code-compressed data of audio data, has at least one clipping position for the code-compressed data in a extended function section, and the clipping position in the extended function section is used for clipping by the computer.

According to another aspect of the data structure, the code-compressed data has a plurality of fragment sections, each fragment section has a plurality of chunk sections, each chunk section has a plurality of sample sections, the clipping position has a start position and a end position specified by samples, the start position is expressed by the number of data units from head of the code-compressed data, the end position is expressed by the number of data units from head of the code-compressed data or by the number of data units from the start position, and the start and the end position have a title text explaining the position and/or fading information for replaying, and the code-compressed data between the start position and the end position is clipped, and is replayed with displaying the title text and/or with applying the fading based on the fading information by the computer.

According to another aspect of the data structure, the code-compressed data is a ISO based media file format data, and the content frame is a 3GPP or 3GPP2 file format.

According to the invention, a computer program product for an apparatus, which has a computer and distributes the content frame, includes first instruction means performing compressed coding of audio data and outputting code-compressed data, second instruction means for outputting the number of data units at the user selection time position as a clipping position based on the time count of the audio data and the number of data units from head of the code-compressed data, and third instruction means for generating the content frame by putting the code-compressed data in a data section and by putting the clipping position in the extended function section of the content frame.

According to the invention, a computer program product for an apparatus, which has a computer and replays the content frame according, includes fourth instruction means for storing the content frame and the clipped code-compressed data, fifth instruction means for outputting the screen image data to enable the selection of a clipping position by the user among clipping positions included in the extended function section, and sixth instruction means for clipping the data section corresponding to the selected clipping position from the code-compressed data of the content frame.

According to another aspect of the computer program product, the code-compressed data have AAC data and SBR data, and the sixth instruction means copies a preceding header for SBR data to head of the clipped data, in case the header is for the clipped data and is not included in the clipped section.

According to another aspect of the computer program product, it further includes the seventh instruction means for reading out the clipped code-compressed data stored by the fourth instruction means when it receives the trigger, the eighth instruction means for decoding the clipped code-compressed data and outputting the decoded audio data, and the ninth instruction means for outputting the decoded audio data to speaker system.

According to another aspect of the computer program product, the apparatus is a mobile terminal, and the trigger is incoming call.

According to another aspect of the computer program product, it further includes the tenth instruction means for outputting the number of data units at the user selection time position as a clipping position based on the time count of the audio data and the number of data units from head of the code-compressed data, and the fourth instruction means add the clipping position to a extended function section of the content frame.

FIG. 1, already described, shows a content distribution system for a mobile terminal;

FIG. 5 shows a screen image output by a clipping selection unit;

FIG. 6 shows a relation between an audio frame and the code-compressed data; and FIG. 7 is a schematic diagram of header copy, in case of clipping the code-compressed data based on AAC and SBR.

The code-compressed data used for music distribution service via the Internet is generated from the PCM coded data, which is obtained from the original sound, using compression coding. Typical compression coding for the audio data is MP3 in accordance with the MPEG1 audio layer III standard (ISO/IEC11172-3, JIS X4323). In addition, MPEG2 audio layer III standard, which function is extended, can use half sampling rate compared to the audio coding in accordance with MPEG1 standard (Sampling rate of MPEG1: 44.10 k/s, Sampling rate of MPEG2: 22.05 k/s).

AAC (Advanced Audio Coding) that specified in the MPEG2 audio layer III improves coding efficiency by maximum 20% to 50% compared to the coding by the MPEG1 audio layer III. ISO based media file format AAC achieves audio quality close to one of the non-compressed CD, and requires less performance for decoding. Compressed coding such as AAC is useful for the mobile terminal, which memory capacity and processor performance are low.

For the creation, distribution and reproduction of the multimedia content, 3GPP ($3^{rd}$ Generation Partnership Project) and 3GPP2 ($3^{rd}$ Generation Partnership Project 2) international standards are specified. 3GPP and 3GPP2 use AAC based extensible file format as audio format.

Figure 1:
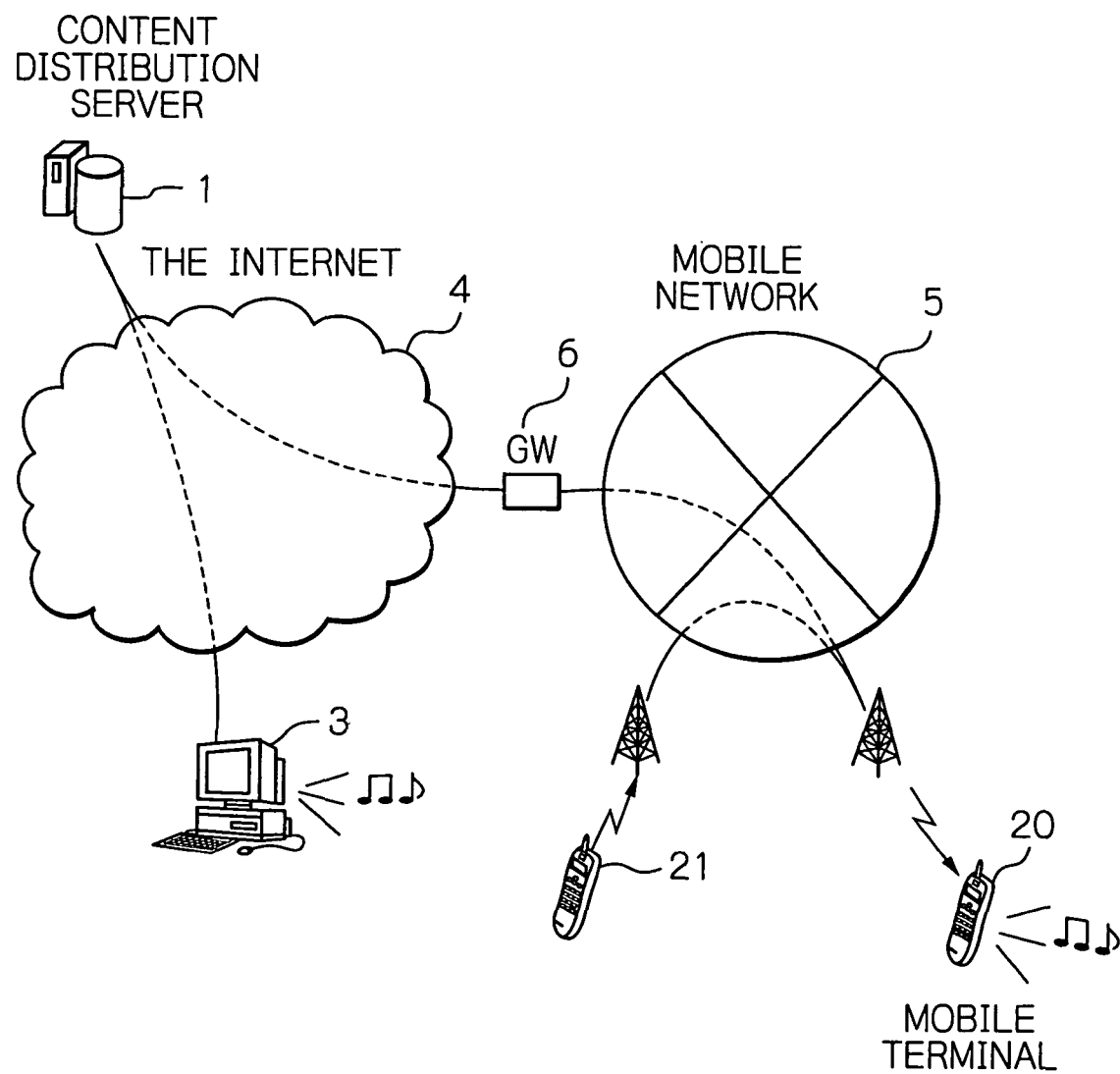
Figure 2:
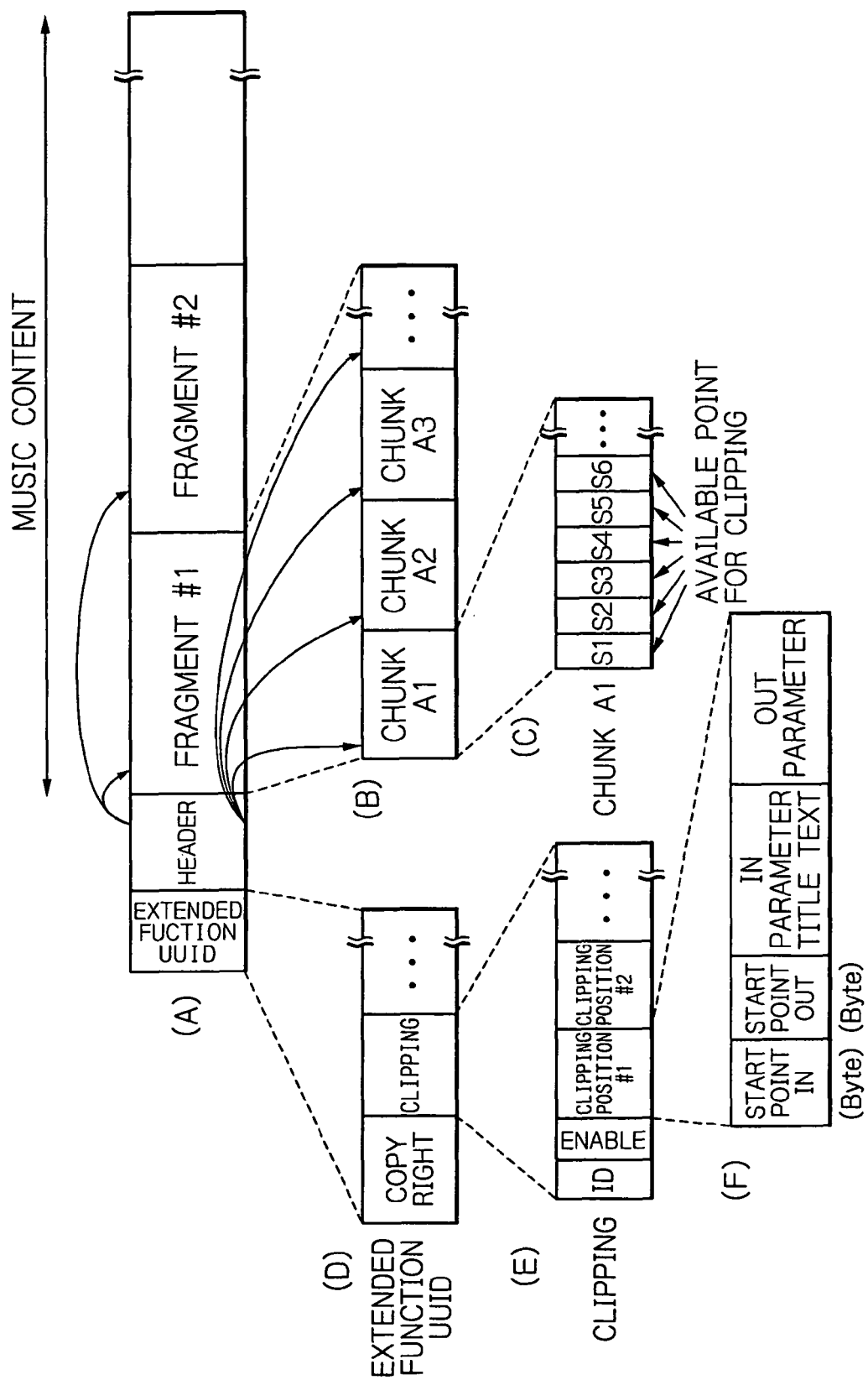
FIG. 2 shows a data structure of a content frame according to the present invention.

FIG. 2 shows a data structure of a content frame according to the present invention.

FIG. 2(A) shows a frame format in accordance with 3GPP and 3GPP2. The frame has a extended function UUID, a header and one or more fragments, each of which has segmented AAC code-compressed data. AAC data in one fragment is for about 15 seconds period. The header indicates the location of each fragment by the number of bytes from head of the frame. However, it can use number of fragments instead of the number of bytes.

FIG. 2(B) shows a format of a fragment. One fragment has a plurality of chunks. One chunk has data for about 1 second period. The header indicates the location of each chunk by the number of bytes from head of the fragment, which it includes. However, it can uses number of chunks instead of the number of bytes.

FIG. 2(C) shows a format of a chunk. One chunk has a plurality of samples. Clipping position, as described later, is specified by sample.

FIG. 2(D) shows a format of the extended function UUID (Universally Unique Information Data). The extended function UUID is a section that service specific information can be added by the content creator. Generally, the extended function UUID has a copyright section. According to the invention, the extended function UUID has a clipping section.

FIG. 2(E) shows a format of the clipping section. The clipping section has an ID, an enable flag and a plurality of clipping position section. The enable flag is set, in case clipping is available. Each clipping position section is used only if the enable flag is set. Each clipping position section has information about the range of clipping based on the chunk of code-compressed data.

FIG. 2(F) shows a format of a clipping position section. The clipping position section has a start position section, end position section, an IN parameter section for the start position section and an OUT parameter section for the end position section. The start and end position are expressed by the number of bytes from head of data. Number of fragments, chunks and samples are also used for start and end position indication. The IN parameter section includes, for example, title text indicating the start position. Further, the IN parameter section and the OUT parameter section include fading (fade-in/out) parameter for the start/end section of the clipped content.

Fade-in parameter included in the IN parameter section is used to increase the gain of audio data for predetermined period. Fade-out parameter included in the OUT parameter section is used to decrease the gain of audio data for predetermined period. The same fading parameters are stored in the content distribution server and the mobile terminal in advance. Fading parameters indicating fading characteristics are included in IN and OUT parameter sections.

Figure 3:
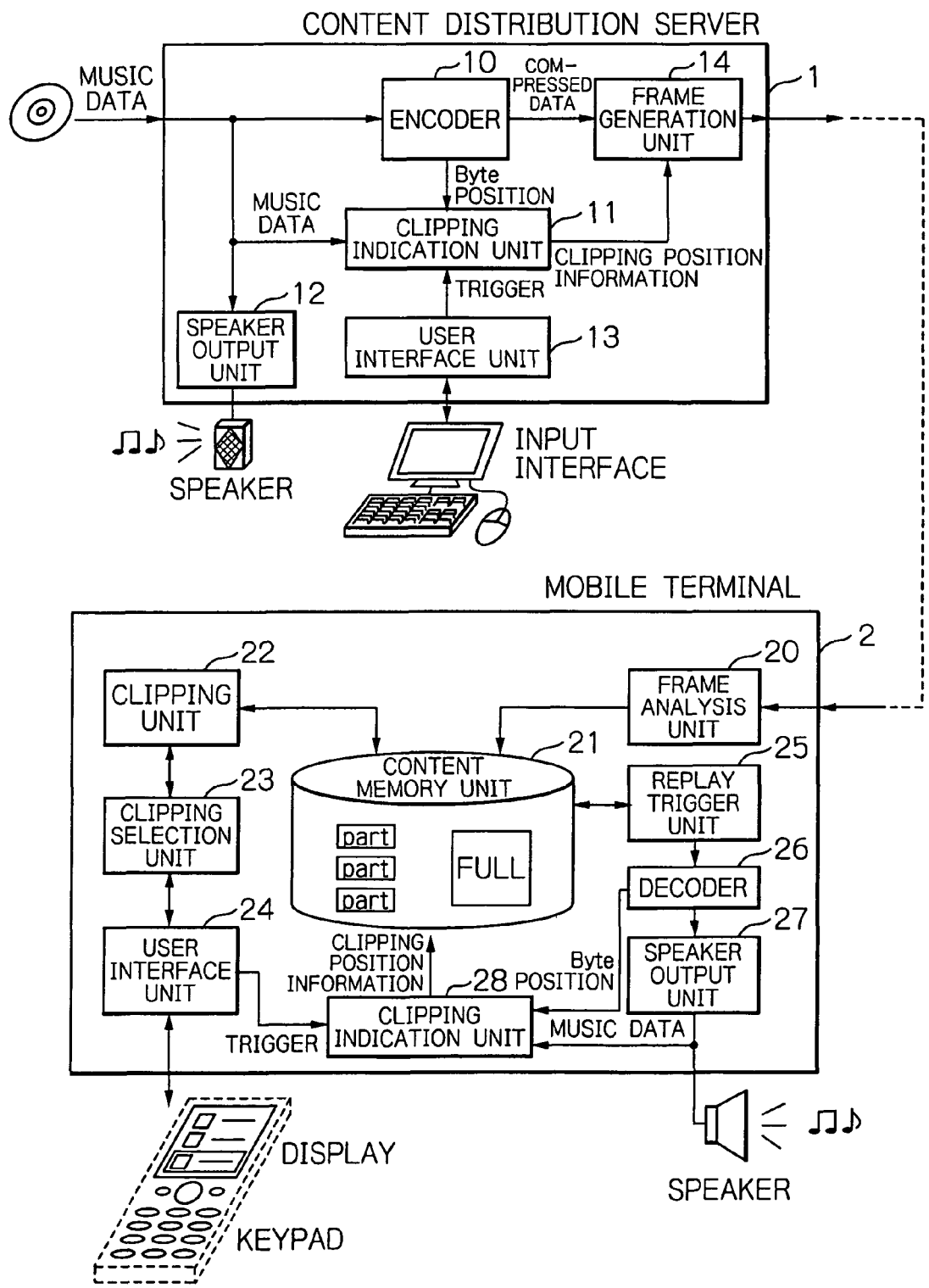
FIG. 3 is a block diagram of a content distribution server and the mobile terminal according to the present invention.

FIG. 3 is a block diagram of a content distribution server and a mobile terminal according to the present invention. Preferably, each function block is realized by the computer program product.

The content distribution server 1 in FIG. 3 outputs a content frame including code-compressed data from input original sound data. The content distribution server 1 has an encoder 10, a clipping indication unit 11, a speaker output unit 12, a user interface unit 13 and a frame generation unit 14.

The encoder 10 performs PCM coding and AAC coding of input original sound data, and outputs code-compressed data. The encoder 10 also outputs byte position information corresponding to elapsed time. The encoder 10 may perform AAC+SBR coding as described later.

The clipping indication unit 11 relates time count of the original sound to byte count of the code-compressed data, and specifies the number of bytes from the head based on clipping trigger input by the user. Specified number of bytes as clipping position is output to the frame generation unit 14. It can uses number of samples instead of number of bytes for specifying the clipping position.

The speaker output unit 12 is provided for outputting original sound data to the speaker, and the operator, who decides the clipping position, can hear the original sound. The user interface unit 13 shows the image, which prompts the operator to decide the clipping position and to input the title text, on the display.

The frame generation unit 14 generates a frame in accordance with the 3GPP or 3GPP2 standard from the code-compressed data output by the encoder 10. At this point, the frame generation unit 14 partitions code-compressed data into fragments and chunks, and adds the clipping position information to the extended function UUID section.

The content frame including code-compressed data is input to the mobile terminal 2 in FIG. 3. The mobile terminal 2 has a frame analysis unit 20, a content memory unit 21, a clipping unit 22, a clipping selection unit 23, a user interface unit 24, a replay trigger unit 25, a decoder 26, a speaker output unit 27 and a clipping indication unit 28.

The frame analysis unit 20 analyzes the content frame based on 3GPP or 3GPP2, and outputs it to the content memory unit 21. The content memory unit 21 stores the content frame.

The clipping unit 22 read the content frame, which is indicated by the user, from the content memory unit 21. Then, the clipping unit 22 extracts the extended function UUID section from the content frame, and checks whether the enable flag is set or not. In case the enable flag is set, the clipping unit 22 outputs a plurality of clipping positions to the clipping selection unit 23. When the clipping unit 22 receives the clipping position selected by the user from the clipping selection unit 23, it clips the selected range from the code-compressed data. The clipped data is stored in the content memory unit 21.

In case the fade information is available in the extended function UUID section, the clipping unit 22 clips the selected range with changing the fading curve. Especially, it changes the gain parameter globali_gain in case of AAC coded data. In case of SBR coded data, it changes gain parameter bs_data_env. This change may be linear or exponential as time advances. Or it may follow the predetermined curve.

The clipping selection unit 23 generates picture data based on clipping positions from the clipping unit 22 for user selection. The picture data is output to the user interface unit 24. When the clipping selection unit 23 receives selection information from the user interface unit 24, it determines a selected clipping position. Then it outputs the selected clipping position to the clipping unit 22.

The user interface unit 24 shows received picture data from the clipping selection unit 23 on a display of the mobile terminal. In addition, it sends selection information, which is input by the user using keypad, to the clipping selection unit 23.

The replay trigger unit 25 read out clipped data from the content memory unit 21 for replaying. The trigger of the replaying is, for example, incoming call to the mobile terminal, receiving new e-mail or replaying operation by the user.

The decoder 26 decodes the clipped data from the replay trigger unit 25 based on AAC and SBR decoding process. Decoded original sound data is output to the speaker output unit 27. In addition, it outputs byte position information to the clipping indication unit 28.

The speaker output unit 27 puts the sound on speaker system based on the decoded original sound data.

For specifying the clipping position by the user of the mobile terminal, the clipping indication unit 28 is provided to the mobile terminal 2. The clipping indication unit 28 has the equivalent function as the clipping indication unit 11 of the content distribution server 1. The clipping indication unit 28 relates time count of the original sound to byte count of the code-compressed data, and specifies the number of bytes from the head based on clipping trigger input by the user. Specified number of bytes as clipping position is stored in the content memory unit 21.

Figure 4:
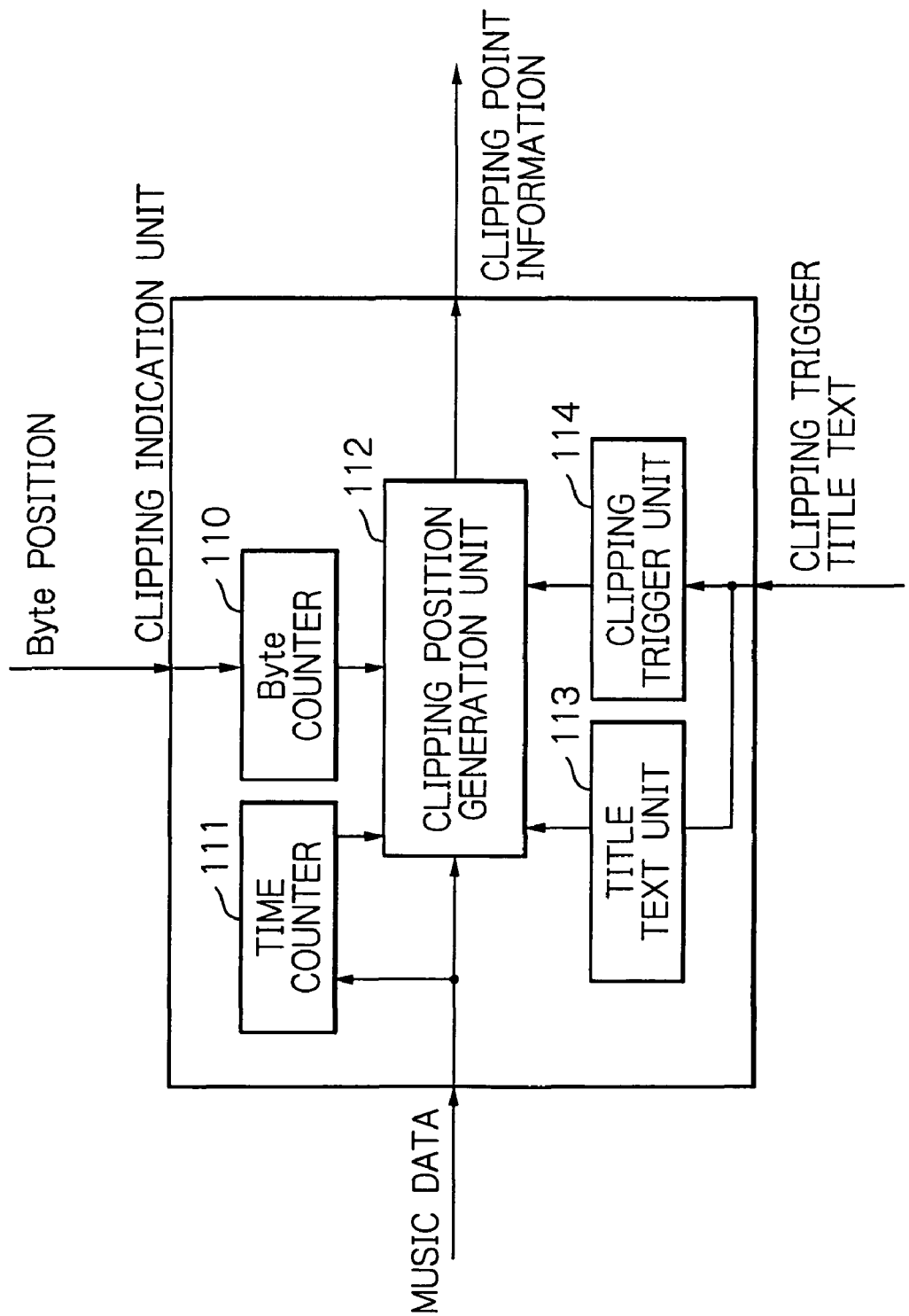
FIG. 4 is a block diagram of a clipping indication unit.

FIG. 4 is a block diagram of the clipping indication unit in the content distribution server or the mobile terminal.

The clipping indication unit has a byte counter 110, a time counter 111, a clipping position generation unit 112, a title text unit 113 and a clipping trigger unit 114. The byte counter 110 counts the number of bytes of the code-compressed data. Therefore, it is possible to specify the number of byte corresponding to the elapsed time of the original sound. The time counter 111 counts the time of the original sound. Therefore, it is possible to relate the elapsed time of the original sound to the byte count. The clipping trigger unit 114 outputs a clipping trigger, which is obtained by the user operation, to the clipping position generation unit 112. The title text unit 113 receives a title text, which specifies the clipping position, and is obtained by the user operation. The obtained title text is output to the clipping position generation unit 112. The clipping position generation unit 112 generates and outputs the clipping position information as shown in FIG. 2(F) based on the byte count at the time of trigger and input title text.

FIG. 5 shows a screen image output by the clipping selection unit 23.

The screen image in FIG. 5(A) shows titles for one song, that is "lead-in", "first verse", "second verse", "chorus" and "interlude". Each title is stored in each IN parameter section in the clipping position section respectively. The user can select the clipping position.

The screen image in FIG. 5(B) prompts the user to select the length of clipping from the start position selected by using screen image shown in FIG. 5(A).

FIG. 6 shows a relation between an audio frame and the code-compressed data.

FIG. 6(A) shows an audio frame for high compression efficiency, but not used for the invention. In this case, data is not proportional to the elapsed time. The compression efficiency is high for the section that contains a lot of silent, and low for the section that contains complicated phrase of the original sound. Therefore, the value of the time counter is not proportional to the valued of the byte counter.

FIG. 6(B) shows an audio frame for the fixed rate for the invention. In this case, the compression efficiency become low, because stuffing data is used. However, the value of the time counter is proportional to the valued of the byte counter. Therefore, it is possible to specify the byte position by the elapsed time.

FIG. 7 is a schematic diagram of header copy in case of the clipping of code-compressed audio data based on AAC and SBR.

SBR (Spectral Band Replication) is a method for improving the sound quality by replicating the high frequency band signal using low frequency band signal at decoder. The header is required for SBR. If clipped data does not include the SBR header, the clipped data cannot be decoded. Therefore, SBR header, which is not included in the clipped data, must be copied to the head of the clipped data to enable the decoding.

End with an account of the advantage of the invention, and application for the service.

The content distributor demands the fee for distributed music content to the user. This includes copyright fee. In case the user uses only a short section of the contents for the ringing, the user wants to get the content with low rate fee, but requires selecting the section he or she uses. However, the content distributor needs to demand fee for one song, if the contents distributor distributes the one song.

In this case, the content distributor may demand the fee based on the section, which the user uses, while distributing the one song, if it is clear the user uses only the short section.

Using the invention, the content distribution service, which distributes the one song to the user, and demand the fee for the section that the user uses, become available.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A terminal device for receiving a content frame, the terminal device comprising:
a content memory that stores the content frame, the content frame including
a data section that stores code-compressed data of audio data, and an extended function section that stores at least one clipping position of the code-compressed data; and
a clipping unit that clips, by a processor, the data section corresponding to said at least one clipping position from the code-compressed data of the content frame based on a number of data units from a head of the code-compressed data and a relationship of a time count of the audio data to a data unit count of the code-compressed data,
wherein the code-compressed data is an ISO based media file format data including AAC data and SBR data,
the content frame is in a 3GPP or 3GPP2 file format, and
the clipping unit copies a preceding header for SBR data to head of the clipped data, in case the preceding header is for the clipped data and not included in a clipped section.

2. The terminal device according to claim 1, wherein
the code-compressed data comprises a plurality of fragment sections, each fragment section includes a plurality of chunk sections,
each chunk section includes a plurality of sample sections, and
the clipping position includes a start position and an end position specified by samples, the start position being expressed by a first number of data units from the head of the code-compressed data, the end position being expressed by a second number of data units from the head of the code-compressed data or by a number of data units from the start position, and the start and the end position having a title text containing position and/or fading information for replaying.

3. The terminal device according to claim 1, further comprising:
a replay trigger that reads out clipped code-compressed data from the content memory when a trigger is received;
a decoder that decodes the clipped code-compressed data and outputs decoded audio data; and
a speaker output unit that outputs the decoded audio data to a speaker system.

4. The terminal device according to claim 3, wherein
the terminal device is a mobile terminal, and
the trigger is an incoming call.

5. The terminal device according to claim 1, further comprising:
a clipping indication unit that outputs the number of data units at a selected time position to identify a clipping position based on the number of data units from the head of the code-compressed data and the relationship between a time count of the audio data to a data unit count of the code compressed data, wherein the content memory adds the clipping position to the extended function section of the content frame.

6. The terminal according to claim 1, wherein the clipping unit is configured to clip the data section based on the number of data units from the head of the code-compressed data and the relationship of the time count of the audio data to the data unit count of the code compressed data, wherein the number of data units and the data unit count are measured in bytes.

7. The terminal device according to claim 1, further comprising:
a clipping selection unit that outputs screen image data to enable the selection of a clipping position from clipping positions included in the extended function section, wherein
the clipping unit clips, by a processor, the data section corresponding to the selected clipping position from the code-compressed data of the content frame based on a number of data units from a head of the code-compressed data and a relationship of a time count of the audio data to a data unit count of the code-compressed data.

8. A non-transitory computer readable storage medium having stored thereon a content frame replaying program for replaying the content frames, that when executed by the computer causes the computer to carry out a method comprising:

storing a content frame that includes
a data section that stores code-compressed data, and
an extended function section that stores at least one clipping position of the code-compressed data; and clipping the data section corresponding to said at least one clipping position from the code-compressed data of the content frame based on a number of data units from a head of the code-compressed data and a relationship between a time count of an audio data to a data unit count of the code-compressed data, wherein the code-compressed data includes AAC data and SBR data, and wherein a preceding header for SBR data is copied to a head of the clipped data when the header is for the clipped data and is not included in a clipped section.

9. The non-transitory computer readable storage medium according to claim 8, further comprising:
reading out clipped code-compressed data when a trigger is received;
decoding the clipped code-compressed data and outputting decoded audio data; and
outputting the decoded audio data to a speaker system.

10. The non-transitory computer readable storage medium according to claim 9, wherein
the computer is a mobile terminal, and
the trigger is an incoming call.

11. The non-transitory computer readable storage medium according to claim 8, further comprising:
outputting the number of data units at a selected time position to identify a clipping position based on the number of data units from the head of the code-compressed data and the relationship between the time count of the audio data to the data unit count of the code compressed data, wherein the clipping position is added to the extended function section of the content frame.

12. The non-transitory computer readable storage medium according to claim 8, wherein the number of data units and the data unit count are measured in bytes.

13. The non-transitory computer readable storage medium according to claim 8, further comprising:
outputting screen image data to enable a selection of a clipping position from clipping positions included in the extended function section; and
clipping the data section corresponding to a selected clipping position from the code-compressed data of the content frame based on a number of data units from a head of the code-compressed data and a relationship between a time count of an audio data to a data unit count of the code-compressed data.

* * * * *